United States Patent
Maluf

(10) Patent No.: US 7,529,769 B1
(45) Date of Patent: May 5, 2009

(54) DATA PARTITIONING IN MULTIPLE DATABASES

(75) Inventor: David A. Maluf, Mountain View, CA (US)

(73) Assignee: Cap Epsilon, Inc., Los Altos, CA (US)

(*) Notice: Subject to any disclaimer, the term of this patent is extended or adjusted under 35 U.S.C. 154(b) by 186 days.

(21) Appl. No.: 11/600,590

(22) Filed: Nov. 15, 2006

Related U.S. Application Data

(60) Provisional application No. 60/820,078, filed on Jul. 21, 2006.

(51) Int. Cl.
G06F 7/00 (2006.01)
G06F 17/00 (2006.01)
(52) U.S. Cl. ...................... 707/102; 707/100
(58) Field of Classification Search ............. 707/1–4, 707/100–102
See application file for complete search history.

(56) References Cited

U.S. PATENT DOCUMENTS

| 7,249,141 | B2* | 7/2007 | Agrawal et al. | 707/102 |
| 7,260,583 | B2* | 8/2007 | Wiener et al. | 707/102 |
| 2007/0067366 | A1* | 3/2007 | Landis | 707/205 |

* cited by examiner

Primary Examiner—Wilson Lee
Assistant Examiner—Merilyn P Nguyen
(74) Attorney, Agent, or Firm—Zilka-Kotab, PC

(57) ABSTRACT

Method and associated system for partitioning a collection of databases, by indexing folders within each database, files within each folder, documents within each file, and features (characters, words, phrases, symbols, expressions and image components) with each document so that content and context searching can proceed at any level. Databases need not be mutually exclusive, and a document, file or folder may be referenced in more than one database. One or more documents or files or folders or databases can be added to, or deleted from, the collection without changing the indexing scheme or interpretation assigned to a concatenated index.

13 Claims, 2 Drawing Sheets

DATA PARTITIONING IN MULTIPLE DATABASES

ORIGIN OF THE INVENTION

This application is preceded by, and relies upon, Provisional Application No. 60-820,078, filed Jul. 21, 2006 and entitled "A Method For Partitioning Data In Databases."

FIELD OF THE INVENTION

This invention relates to data partitioning for efficient formatting and searching in a plurality of databases.

BACKGROUND OF THE INVENTION

Data partitioning is a challenge in many database systems. The challenge results from the need for constant access to data and constant indexing of new content while performing data insertion, deletion, and content and data updates. A database managing content and data must operate and respond to queries, which occur at almost the same time when the content and data are being added, modified, retrieved or deleted. Further, many of these datasets may consist of all electronic files and records in arbitrary formats. A format may exhibit a structure, or a semi-structure, or the dataset may be completely unstructured. Examples of such formatted contents are word processing documents, annotated documents such as XML or HTML, and documents containing free text.

Content searching and data query searching in data sets are time consuming when the data constantly changes. This is due, in large measure, to the maintenance of the inverted indices referring to word, phrase, or other information within the datasets and documents: For example, a relevant word and/or phrase can occur in many locations in the datasets and if the datasets changes, the indices must be updated to reflect the change. Indexing data is computing extensive process and involves reading the datasets and creating the indices correspondingly. Further, constant changes on the datasets fragments the storage device rendering it ineffective over time. However, de-fragmentation is a costly process and involves moving massively data around the storage devices, which is time consuming and may in most cases, necessitate further re-indexing. Whether re-indexing or data management, the current state of art is not effective to the access and delivery of information to the information user and has been a major challenge in database management face.

What is needed is a system and associated method for flexibly indexing and searching a plurality of databases, which may have different structures or no structure, that provides and uses information on each feature (byte, word, phrase, symbol expression, image component or other appropriate information segment), each document that contains the feature, each file that contains the document, each folder that contains the file and/or each database that contains or refers to the folder. Preferably, the indexing scheme should allow extension downstream (e.g., to provide further metadata for the referenced feature) or upstream (e.g., to allow further refinement in referral to databases within the collection). Preferably, the index expression referring to a particular feature should be sufficiently intuitive to provide, at a glance, useful information on the nature of the feature.

SUMMARY OF THE INVENTION

These needs are met by the invention, which provides a flexible indexing scheme, expandable downstream and upstream, to refer to and simultaneously provide useful metadata for a feature (byte, word, phrase, symbol expression, image component or other appropriate information segment), a document that contains the feature, a file that contains the document, a folder that contains the file and/or particular database that contains or refers to the folder. Several databases may refer to a particular feature/document/file/folder/database numerical combination (referred to as a "partition address" here), and reference to this particular combination by the index should be consistent or identical below the level of database reference.

In one embodiment, the invention provides an indexing scheme that is expressed as {super-database/database/folder/file/document/feature/(optional)}, where "(optional)" refers, for example, to a link to relevant metadata that may include context, content and reference(s) or further link(s) to one or more related indices in the same document, file and/or folder.

Another advantage of the invention is to provide content management in a database or a content management system that, upon prescription of new data, allows rapid, targeted insertion update and deletion and allows indexing to respond to queries and searching small subsets of the content that contain only references that are relevant to the targeted queries. This can permit relatively simple and straightforward (i) expansion of the subset to scale with data volume to include more content and data to be stored and indexed upon request (ii) update or deletion of a portion of a subset, in response to updating or correcting one or more references in the subset in very concise responsive time. This approach exposes every byte to be referenced directly and explicitly although the content may grow.

The invention extends the content management systems and databases concept but instead uses the computer operating file system for the effective content partitioning. A partition is a part of an overall database system or content management system and consists of a collection of files which themselves consist of content files and indices. A partition preferably includes a folder, files within a folder, documents within a file, and features within a document for the operating system. The invention refers to having at least one partition. All data belong to at least one file, which is then stored in the partitions. The implementation of the partition uses the file system as the operating system does, and the partition takes the form of a folder or a directory.

After a partition is created, rules and constraints for the partition are defined to control what kind of folders, files, documents and/or data the partition can refer to. These rules may specify file types such as word processing documents, plain text documents, or any other documents structured under an arbitrary format such as XML, web pages or proprietary formats such images. Other rules may apply instead and can specify where each file should reside in which partition based on ranges of file sizes. For rules that use file size ranges as input, a partition is created for each file size range. For rules that use file formats as input, a partition is created for each fileformat. The invention permits partitioning of data, based on all relevant attributes of the content file.

An object of the invention is to partition and index data effectively and flexibly. Partitioning of content allows indices to be decoupled and to reside with each partition. The decoupling of partitions may result in decoupling the associated indices to their corresponding partitions and allows the insertion updates or deletes to occur locally. Indices are updated locally so that complexity is reduced. Another object of the invention to provide, in a generalizable fashion, access at a document level or feature level within a document using a uniform identifier. The partitioning scheme can be modified,

DESCRIPTION OF BEST MODE OF THE INVENTION

Figure 1A:
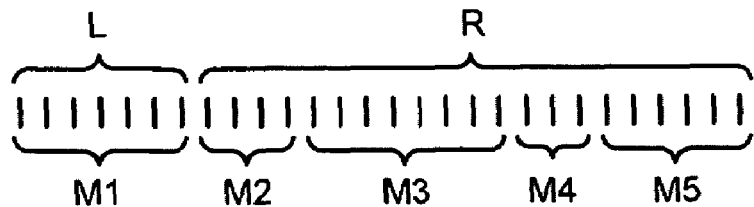
FIGS. 1A-1E schematically illustrate different formats for an index according to the invention.
Figure 1B:
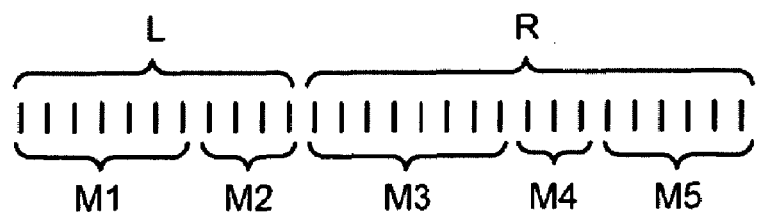
Figure 1C:
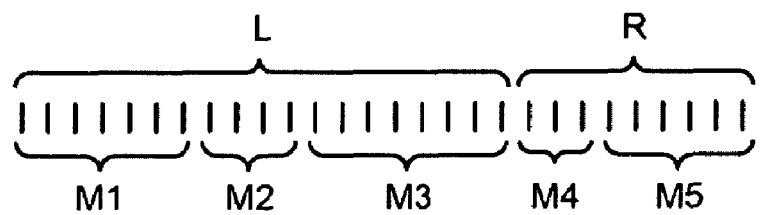
Figure 1D:
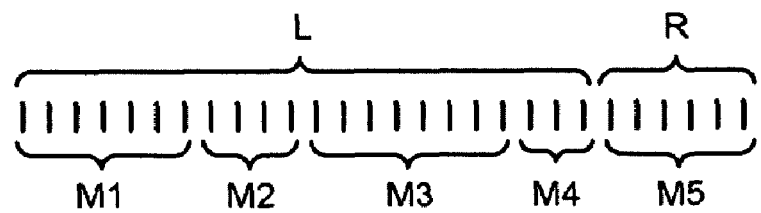

Consider a collection C of databases, consisting of a plurality of DB databases, each with a configuration of folders, files within folders, and documents within files. A given database no. db (db=1, ..., DB; DB$\geq$1) will include a sequence of folders, indexed as fo=fo(db)=1, ..., FO(db), with each folder including a sequence of files, indexed as fi=fi(fo;db)= 1 . . . , FI(fo;db), and each file including a sequence of documents, indexed as do=do(fi;fo;db)=1, ... DO(fi;fo;db). For example, do(fi;fo;db) refers to the present number of documents indexed within the file indexed as fi, which is part of the folder indexed as fo, which is part of the database indexed as db. A document may appear in more than one file/folder/database combination, depending upon the classification rules applied to each document.

Each document (indexed as do=do(fi;fo;db)) has a known number $\mu$(do) of words or other addressable symbols, or bytes representing the features (words, phrases, mathematical expressions and other symbols, image segments, etc.). The features in a document are also indexed as fe=fe(do;fi;fo;db)= 1, . . . , FE(do;fi;fo;db) and may include, or may exclude, all or a selected set of articles (a, the, an, . . . ), connectives (and, or, but, . . . ), possessives (our, your, my, their, etc.), prepositions (at, by, for, . . . ); punctuation symbols (commas, semicolons, colons, etc.) and other subsidiary words and symbols, which amount to an estimated 30 percent or more of words and symbols in an average sentence or other statement.

The following definitions will be useful in determining various sub-partitions for each database and for the collection C. Assume that DB lies in (precisely) one of the binary intervals, defined by the exponent M1, $$2^{M1-1} \leq DB < 2^{M1}, \quad (1)$$

and define or determine the following exponents and corresponding binary intervals $$FO(db) = fo(db)_{max}, \quad (2A)$$

$$2^{M2(fo;db))-1} < fo(db)_{max} \leq 2^{M2(fo;db)}, \quad (2B)$$

$$fi(fo;db)_{max} = \max\{FI(fo;db)|fo=1, \ldots FO(db)\}, \quad (3A)$$

$$2^{M3(fi;fo;db)-1} < fi(fo;db)_{max} \leq 2^{M3(fi;fo;db)}, \quad (3B)$$

$$do(fi;fo;db)_{max} = \max\{DO(fi;fo;db)|fi=1, \ldots, FI(fo;db)\}, \quad (4A)$$

$$2^{M4(do;fi;fo;db)-1} < d(fi;fo;db)_{max} \leq 2^{M4(do;fi;fo;db)}, \quad (4B)$$

$$fe(do;fi;fo;db)_{max} = \max\{FE(do;fi;fo;db)|d(fi;fo;db)= 1, \ldots, DO(fi;fo;db)|fi=1, \ldots, FI(fo;db)\}, \quad (5A)$$

$$2^{M5(do;fi;fo;db)-1} < fe(do;fi;fo;db)_{max} \leq 2^{M5(d;fi;fo;db)} \quad (5B)$$

The maximum number N of binary intervals (e.g., bits) required to specify a location of a feature within a document, within a file, within a folder, within a database is then a combination of $$N=M1+M2+M3+M4+M5(\text{optional})=L+R \quad (6A)$$

exponents. One can specify a decomposition (FIGS. 1A-1D) of the database collection C as $$L=M1, R=M2+M3+M4+M5 \quad (6B)$$

or as $$L=M1+M2, R=M3+M4+M5, \quad (6C)$$

or as $$L=M1+M2+M3, R=M4+M5. \quad (6D)$$

or as $$L=M1+M2+M3+M4, R=M5, \quad (6E)$$

where a constraint N$\leq$N(max) is imposed, based upon storage considerations and/or the maximum size of the indexing symbol (e.g., N(max)=32 or 48 or 64). This decomposition is more efficient than a quartal or octal or hexidecimal decomposition, where the radix 2 in Eqs. (1), (2B), (3B) and (4B) is replaced by 4 or 8 or 16, respectively.

For example, if DB=14, FO(db)$_{max}$=76, FI(fo;db)$_{max}$=37 and DO(fi;fo;db)$_{max}$=3084, and feature location is not included, one verifies that

M1=4,
M2=7,
M3=6,
M4=12, and N=29 bits suffices to fully partition this collection of databases.

The feature sought may be an "image segment," defined herein as a collection of one or more linear and/or curvilinear segments, or planar or curved hyperplanes, in a particular geometric or location arrangement relative to each other. If the image segment is an Q-dimensional graph (Q$\geq$2) of a first variable (abscissa or x-axis) versus a second variable (ordinate or y-axis) versus . . . versus a Qth variable, the image segment includes an identification of the physical nature and range of values of each of the Q variables, together with the physical units of mass, distance, time, thermal content, electromagnetic content, etc. used for each of the Q variables.

Figure 1E:
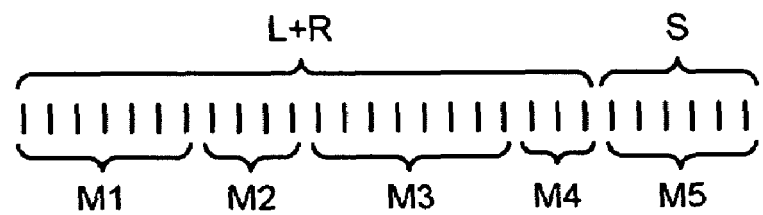

Optionally, the feature location index fe may be deleted, or a separate sub-partition may be maintained for this index, to provide greater range for the document, file, folder and/or database indices. A long document d, such as a book, may have $\mu$(do)=50,000 words or more, with an average of about seven characters per word, including blank spaces and punctuation marks. Such a document will contain an estimated 350,000 text features alone, which requires an estimated 19 bits (2$^{19}$$\approx$524,288) to adequately cover all text features. It may be preferable to provide another Q-bit feature index (e.g., Q=20) to cover the individual text features in a document. Alternatively, the feature locator index M5 in Eqs. (6B)-(6E) may be included as a supplementary index S=M5 so that Eq. (6A) is re-expressed as $$N=L+R+S, \quad (6A')$$

as illustrated in FIG. 1E.

Where a given address level contains a maximum of K objects (databases, folders, files, documents or features), M-level indexing of this address level, with M=2, 4, 8 or 16, will normally require $$U = [\log_M\{K\}]_{int} + 1 \quad (7)$$

M-level symbols to distinguish between different objects in this level, where $[w]_{int}$ refers to the integer part of the real number w (the largest integer less than or equal to w). Proceeding in this manner, one an assign a maximum bit size M to each address level, as is done in Eqs. (2A)-(5B) for binary indexing with M=2.

As additional databases or folders or files or documents are added to the collection C, or as additional features are recognized and indexed within a document, one or more of the exponents M1, M2, M3, M4 and/or M5 may need to be increased by one or more units, consistent with the constraints set forth in the constraint relations (1)-(5B). Alternatively, one or more of the exponents Mk=M1, M2, M3, M4 and/or M5 may be allowed to decrease by one unit, because one or more database, folder, file, document and/or feature is deleted from the indexing scheme. Implementing a decrease, $\Delta Mk = -1$, in an exponent is straightforward: replace the binary symbol having the largest value for that interval by the fixed value 0 for all attributes at that level. For example, exponent no. M4 for the document index would be replaced by the fixed value 0 for all documents in all files in all folders in all databases. No changes are required in a treatment of any of the other exponents.

Implementing an increase, $\Delta Mk=+1$, for an attribute (e.g., M2 for the folder index) requires replacement of the corresponding exponent by +1, and this may have consequences in interpretation of one or more of the collective exponents L and/or R and/or S, because the exponent sum, L, R, L+R or L+R+S, increases by one unit. One method of providing for this contingency, which can occur naturally with growth of a collection of attributes (databases, folders, files, documents and/or features) within a given document, is to replace each of the exponents Mk by an augmented exponent, $$Mk' = Mk + \Delta Mk \quad (8)$$

where $\Delta Mk$ is an appropriately chosen positive integer (+1, +2, etc.), in the constraint relations (1)-(5B). Each of the additional binary interval values corresponding to the exponent augmentations $\Delta Mk$ is initially assigned the value 0 In the example, DB=14, $FO(db)_{max}=76$, $FI(fo;db)_{max}=37$ and $DO(fi;fo;db)_{max}=3084$, discussed in the preceding, the augmented indices might be assigned the values M1'=M1+1=5, M2'=M2+2=9, M3'=M3+1=7 and M4'=M4+2=14 so that L+R (augmented)=5+9+7+14=35. Augmentation of a maximum FE for the feature index fe can be implemented in a similar manner.

Using this approach permits implementation of an exponent increase, $Mk \rightarrow Mk+1$, for the corresponding augmented attribute index, with no changes being required in interpretation of any of the exponents or in the sums L, R, L+R and L+R+S. This is an important advantage of the invention. In a conventional approach, reconfiguration of the attribute indices that requires index re-assignment may require re-interpretation of every index for every attribute; this would be equivalent to reconstructing the partition from the beginning, whenever an attribute exponent Mk is increased by one or more units.

Figure 2:
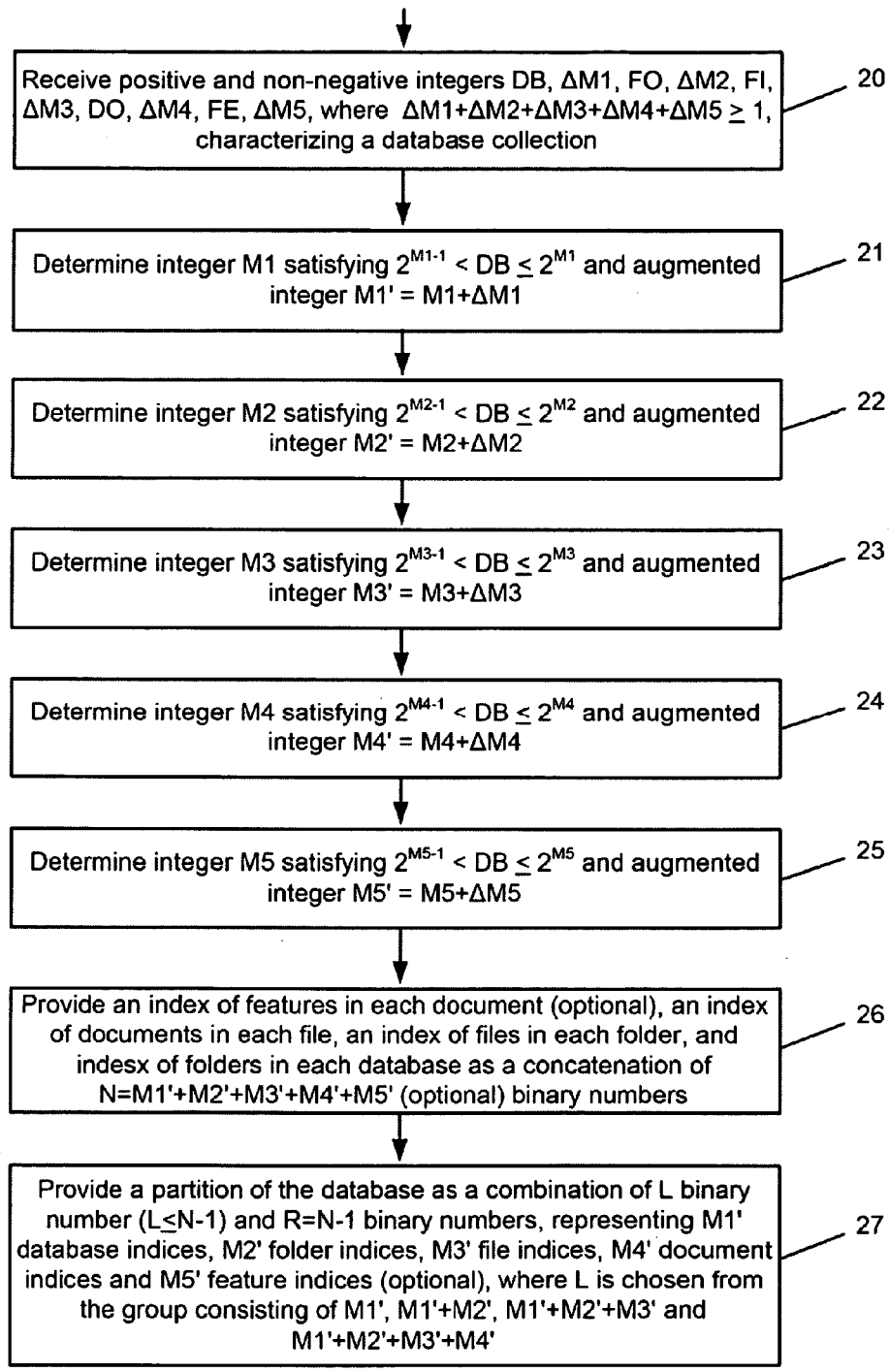
FIG. 2 is a flow chart of a procedure for practicing the invention.

FIG. 2 is a flow chart of a procedure, performed by a computer, for practicing the invention, using the exponent augmentation approach discussed in the preceding. In step 20, the system receives positive and non-negative integers DB, $\Delta M1'$, FO, $\Delta M2'$, FI, $\Delta M3'$, DO, $\Delta M4'$, FE and $\Delta M5'$, characterizing number of databases, number of folders in the databases, number of files in the folders, number of documents in the files, and number of features in the documents, respectively, in a collection of databases, where $\Delta M1' + \Delta M2' + \Delta M3' + \Delta M4' + \Delta M5' \geq 1$.

In step 21, a first exponent M1 is determined, satisfying $2^{M1-1} < DB \leq 2^{M1}$ and an augmented first exponent M1'=M1+$\Delta M1$, where $\Delta M1$ is a selected non-negative integer. In step 22, a second exponent M2(db) is determined, satisfying $2^{M2(db)-1} < FO \leq 2^{M2(db)}$, with FO=FO(db)=max{fo(db)}, and an augmented second exponent M2'=M2+$\Delta M2$, where $\Delta M2$ is a selected non-negative integer. In step 23, a third exponent M3(db;fo) is determined, satisfying $2^{M3(db;fo)-1} < FI \leq 2^{M3(db;fo)}$, with FI=FI(fo;db)=max{fi(fo;db)}, and an augmented third exponent M3'=M3+$\Delta M3$, where $\Delta M3$ is a selected non-negative integer. In step 24, a fourth exponent M4(db;fo;fi) is determined, satisfying $2^{M4(db;fo;fi)-1} < DO \leq 2^{M4(db;fo;fi)}$, with DO=DO(fi;fo;db)=max{do{fi;fo;db)}, and an augmented fourth exponent M4'=M4+$\Delta M4$, where $\Delta M4$ is a selected non-negative integer.

In step 25 (optional), a fifth exponent M5(db;fo;fi;do) is determined, satisfying $2^{M5(db;fo;fi;do)-1} < FE \leq 2^{M5(db;fo;fi;do)}$, with FE=FE(do;fi;fo;db)=max{fe(do;fi;fo)}, and an augmented fifth exponent M5'=M5+$\Delta M5$, where $\Delta M5$ is a selected non-negative integer, where $\Delta M1 + \Delta M2 + \Delta M3 + \Delta M4 + \Delta M5 \geq 1$.

In step 26, the system provides an index of features in each document in each file in each folder in each database as a concatenation of N=M1'+M2'+M3'+M4'+M5' binary numbers. In step 27, the system provides a partition of the database collection as a combination of L binary numbers (L≤N−1) and R=N−L binary numbers representing M1' database indices, M2' folder indices, M3' file indices, M4' document indices and M5' feature indices, where L is chosen from the group of integers consisting of M1', M1'+M2', M1'+M2'+M3' and M1'+M2'+M3'+M4'.

Where exponent augmentation is not included, the increments $\Delta M1$, $\Delta M2$, $\Delta M3$, $\Delta M4$ and $\Delta M5$ are all set equal to 0 in FIG. 2. Where a feature index is not included, all instances of the feature index fe, the feature exponent M5 and the augmented feature exponent M5'=M5+$\Delta M5$ are deleted in FIG. 2.

In a preferred embodiment, the limitations of the storage device are first exposed. In an operating systems with a 32-bit or 48-bit address, the maximum size of a file is about 4 Gigabytes or 280 Terabytes, respectively. Also, the number of files in a single folder, and number of documents within a single file, is limited by the storage configuration. Thus, the constraining factors are the maximum byte size of a file and the maximum number of files in a partition. Where required, a 32-bit pointer may be replaced by a 31-bit pointer, plus one bit for a signum (±).

Initially a document is received and analyzed, using a first class of attributes, such as content, context, data type (e.g., text, math. expression, other symbol, image segment, etc.) and/or document size. After the applicable rule is selected, an index for the document is created and the document is stored in the appropriate partition, or optionally in more than one partition, each constructed from a different perspective. The invention manages the number of documents stored in the created partitions. Once the number of documents, or number of files, or number of folders, in a partition reaches a selected threshold, a new a partition is created for that category or rule, and newly received files are stored in, and indexed according to, the new partition. Alternatively, the rule(s) governing the partitioning and associated indexing can be changed as the addressing proceeds, to take account of occurrence of a larger number of folders or files or documents than was initially expected. Ideally, all partitions associated with the same rules are stored in uniquely named folders identifying the applicable rules.

When it is desirable to separate the folder content based on an external naming convention, another folder is used, and for each external naming convention the appropriate selection rules are created within that folder. The external naming convention may refer to a database name, a user name, a domain name or other selected label. For example, a user may choose to partition all content and data belonging to the medical field separately from the content and data from the science field (not including medicine).

Optionally, each feature fe in a document is provided with one or more links, to the same word within that document and/or to metadata relevant to that feature or word/phrase containing that feature.

EXAMPLE

An example is presented here, demonstrating a hierarchy, beginning with database name folder containing a folder named after a rule containing a folder named after a partition number containing a file which obey the applicable rule named beforehand.

database name/rule name or reference/partition number/file number, where the symbol "/" refers to a hierarchal folder structure. Each "database name" may have one or more applicable rules under "rule name", each "rule name" may have one or more sub-partitions under "partition number," and each partition "partition number" may contain one or more associated files. Additional folders, files and/or documents may be added.

When the number of folders and files and documents is not large and the operating system constraints are satisfied, two consecutive folders may be optionally collapsed to a single super-folder by concatenating the folder names. For example, when the number of databases is not large and the number of applicable rules are not large, concatenation can replace a folder number or file number by a corresponding super-folder name or super-file name. A symbolic example, expressed in hexadecimal, would appear as in the following:

0EF93/0A/00FE001/0008FFFFF/abcdefgh, where "0EF93" is a hexadecimal representation of the arbitrary database number (here, 14×4096+15×256+9×16+3×1=61,331 in decimal representation, followed by a space (optional) for improved visual separation. The expression "0A" is a hexadecimal representation of folder number (here, 10 in decimal representation). The expression "00FE001" is a hexadecimal representation of file number (15×65,536+14×4096+1×1=999,425 in decimal representation). It is preferable that partition number increase monotonically beginning at 0, to keep track of the total. The symbol "0008FFFFF'" is a hexadecimal number representing document number, and the symbol "abcdefgh" represents byte or feature location within the document specified.

A preferred method is to proceed and arrange the file placements in each possible partition with a threshold for each file size of T<2 Gigabytes. The 2-Gigabyte limit is an inherit limit due to a 32-bit operating file system. The partition limit of T<2 Gigabyte for 32 bits operating system is operating system dependent. This method is also appropriate for any type of address mapping on operating systems such as 48-bit and 64-bit operating systems. When applying these rules for all files, one will guarantee an arrangement of 1 file of maximum size T could be possible stored in a single partition, 2 files of maximum size T/2 in a single partition, 3 files of maximum size T/3 in a single partition and more generally N files of maximum size T/N in a single partition. The number N is also limited.

In a preferred embodiment, and in the example of a 32-bit address mapping, one can choose an unsigned integer Num to be of size 32 bits and to point as offset to any byte location in a file. When Num is zero, the pointer indicates a beginning of the file, for a value of 1 it points to the second byte in the file, and so on. In this embodiment Num can point to any byte location in a file contained in a partition and be computed to contain the file number. Specifically, the arrangement of Num is computed as follows:

Whether a 32-bit address mapping or any other mapping scheme is selected for addressing, Num is divided into the left hand bits L and the right hand side bits R, as indicated in the preceding, where L+R is the total number of bits available (e.g., 32 or 48 or 64) for an address mapping scheme.

Files (and, similarly, folders) can be arranged based on the file size and can be stored in partitions and the maximum number of allowable files in each partition is computed as the minimum of: the number of the addressing bit of the operating system subtracting the number the number of bits needed to represent the file size, or the set of allowed files in a folder, whichever is smaller.

For example, if a file has a size between 513 bytes and 1024 bytes, the maximum numbers of bits needed to point anywhere in the file is 10 bits. Subsequently, one can also realize the representation of any byte location in the file is done at most by the number of bits defined by the logarithm of the file size+1, as in Eq. (7). In this example, Num would be constructed such that the first L=32−10=22 bits represents the file number fi, which can lie in a range $0 \leq fi \leq 4,194,303$ in decimal representation, or 8FFFFF in hexadecimal representation. Num can indicate any byte location in a partition containing multiple files.

Following this ordering scheme, the naming convention can be a hexadecimal (or octal or quartal or binary) representation of number. One can construct the following string representing precisely a location of a selected byte in the database. An example is the folder/file/document hierarchy 0EF93 0A/00FFE001/0008FFFFF/abcdefgh discussed in the preceding, where abcdefgh represents byte or feature location, expressed in hexadecimal, in the document number 0008FFFF.

Another element of this embodiment is the process of presenting the byte position within the document represented as "0008FFFFF." For 32-bit operating systems, eight characters expressed in hexadecimal can represent a complete address space for a file or a document.

When partitioning is based on file size, a dynamic combination of maximum number of files in a partition and the maximum number of bits needed to address that file is allowed; the maximum number of files times maximum file size allowed in that partition will not exceed $2^{32}$ for a 32-bit operation systems. This invention encodes document number, file number and folder number (and optionally, database number and/or byte or feature location within a document) in a character string.

I claim:

1. A method of partitioning a collection C of databases, where each database has a database index db, numbered db=1, . . . , DB, and contains at least one folder, each folder has a folder index fo(db), numbered fo(db)=1, . . . , FO(db), each folder contains at least one file, each file has a file index fi(fo,db), numbered fi(fo,db)=1, . . . , F(fo,db), each file contains at least one document, each document has a document index do(fi,fo,db), numbered do(fi,fo,db)=1, . . . , DO(fi,fo, db), each document contains at least one of words, phrases, symbols, mathematical expressions and/or image components, referred to collectively as "features," with each feature having a feature index fe, numbered fe(do,fi,fo,db)=1, . . . , FE(do,fi,fo,db), and each index being expressed as a sequence of one or more bits, the method comprising providing a computer that is programmed:

to receive positive and non-negative integers DB, FO, FI, DO and FE and $\Delta M5'$, characterizing number of databases, number of folders in the databases, number of files in the folders, number of documents in the files, and number of features in the documents, respectively, in a collection of databases;

to determine a first exponent M1 satisfying $2^{M1-1} < DB \leq 2^{M1}$;

to determine a second exponent M2(db) satisfying $2^{M2(db)-1} < FO \leq 2^{M2(db)}$, with FO=FO(db)=max{fo(db)};

to determine a third exponent M3(db;fo) satisfying $2^{M3(db,fo)-1} < FI \leq 2^{M3(db,fo)}$, with FI=FI(fo;db)=max{fi(fo;db)};

to determine a fourth exponent M4(db;fo;fi) satisfying $2^{M4(db,fo,fi)-1} < DO \leq 2^{M4(db,fo,fi)}$, with DO=DO(fi;fo;db)=max{do{fi;fo;db)};

to determine a fifth exponent M5(db;fo;fi;do) satisfying $2^{M5(db,fo,fi,do)-1} < FE \leq 2^{M5(db,fo,fi,do)}$, with FE=FE(do;fi;fo;db)=max{fe(do;fi;fo)};

to provide an index of features in each document in each file in each folder in each database as a concatenation of N=M1+M2+M3+M4+M5 binary numbers; and to provide a partition of the database collection as a combination of L binary numbers (L≦N−1) and R=N−L binary numbers representing M1 database indices, M2 folder indices, M3 file indices, M4 document indices and M5 feature indices, where L is chosen from the group of integers consisting of M1, M1+M2, M1+M2+M3 and M1+M2+M3+M4.

2. The method of claim 1, further comprising constraining said binary number N to be at least one of N≦32, N≦48 and N≦64.

3. The method of claim 1, further comprising limiting said features in said document to words and phrases that are not an article, not a connective, not a possessive and not a preposition.

4. A method of partitioning a collection C of databases, where each database has a database index db, numbered db=1, . . . , DB, and contains at least one folder, each folder has a folder index fo(db), numbered fo(db)=1, . . . , FO(db), each folder contains at least one file, each file has a file index fi(fo,db), numbered fi(fo,db)=1, . . . , FI(fo,db), each file contains at least one document, each document has a document index do(fi,fo,db), numbered do(fi,fo,db)=1, . . . , DO(fi,fo,db), each document contains at least one of words, phrases, symbols, mathematical expressions and/or image components, referred to collectively as "features," with each feature having a feature index fe, numbered fe(do,fi,fo,db)=1, . . . , FE(do,fi,fo,db) and each index being expressed as a sequence of one or more bits, the method comprising providing a computer that is programmed:

to receive positive and non-negative integers DB, $\Delta M1'$, FO, $\Delta M2'$, FI, $\Delta M3'$, DO, $\Delta M4'$, FE and $\Delta M5'$, characterizing number of databases, number of folders in the databases, number of files in the folders, number of documents in the files, and number of features in the documents, respectively, in a collection of databases, where $\Delta M1' + \Delta M2' + \Delta M3' + \Delta M4' + \Delta M5' \geq 1$;

to determine a first exponent M1 satisfying $2^{M1-1} < DB \leq 2^{M1}$ and an augmented first exponent $M1'=M1+\Delta M1$, where $\Delta M1$ is a selected non-negative integer;

to determine a second exponent M2(db) satisfying $2^{M2(db)-1} < FO \leq 2^{M2(db)}$, with FO=FO(db)=max{fo(db)}, and an augmented second exponent $M2'=M2+\Delta M2$, where $\Delta M2$ is a selected non-negative integer;

to determine a third exponent M3(db;fo) satisfying $2^{M3(db,fo)-1} < FI \leq 2^{M3(db,fo)}$, with FI=F(fo;db)=max{fi(fo;db)}, and an augmented third exponent $M3'=M3+\Delta M3$, where $\Delta M3$ is a selected non-negative integer;

to determine a fourth exponent M4(db;fo;fi) satisfying $2^{M4(db,fo,fi)-1} < DO \leq 2^{M4(db,fo,fi)}$, with DO=DO(fi;fo;db)=max{do{fi;fo;db)}, and an augmented fourth exponent $M4'=M4+\Delta M4$, where $\Delta M4$ is a selected non-negative integer;

to determine a fifth exponent M5(db;fo;fi;do) satisfying $2^{M5(db,fo,fi,do)-1} < FE \leq 2^{M5(db,fo,fi,do)}$, with FE=FE(do;fi;fo;db)=max{fe(do;fi;fo)}, and an augmented fifth exponent $M5'=M5+\Delta M5$, where $\Delta M5$ is a selected non-negative integer, where $\Delta M1+\Delta M2+\Delta M3+\Delta M4+\Delta M5 \geq 1$;

to provide an index of features in each document in each file in each folder in each database as a concatenation of N=M1'+M2'+M3'+M4'+M5' binary numbers; and to provide a partition of the database collection as a combination of L binary numbers (L≦N−1) and R=N−L binary numbers representing M1' database indices, M2' folder indices, M3' file indices, M4' document indices and M5' feature indices, where L is chosen from the group of integers consisting of M1', M1'+M2', M1'+M2'+M3' and M1'+M2'+M3'+M4'.

5. The method of claim 4, further comprising constraining said binary number N to be at least one of N≦32, N≦48 and N≦64.

6. The method of claim 4, further comprising limiting said features in said document to words and phrases that are not an article, not a connective, not a possessive and not a preposition.

7. A method of partitioning a collection C of databases, where each database has a database index db, numbered db=1, . . . , DB, and contains at least one folder, each folder has a folder index fo(db), numbered fo(db)=1, . . . , FO(db), each folder contains at least one file, each file has a file index fi(fo,db), numbered fi(fo,db)=1, . . . , FI(fo,db), each file contains at least one document, and each document has a document index do(fi,fo,db), numbered do(fi,fo,db)=1, DO(fi,fo,db), each index being expressed as a sequence of one or more bits, the method comprising providing a computer that is programmed:

to receive positive and non-negative integers DB, FO, FI and DO, characterizing number of databases, number of folders in the databases, number of files in the folders, and number of documents in the files respectively, in a collection of databases;

to determine a first exponent M1 satisfying $2^{M1-1} < DB \leq 2^{M1}$;

to determine a second exponent M2(db) satisfying $2^{M2(db)-1} < FO \leq 2^{M2(db)}$, with FO=FO(db)=max{fo(db)};

to determine a third exponent M3(db;fo) satisfying $2^{M3(db,fo)-1} < FI \leq 2^{M3(db,fo)}$, with FI=FI(fo;db)=max{fi(fo;db)};

to determine a fourth exponent M4(db;fo;fi) satisfying $2^{M4(db,fo,fi)-1} < DO \leq 2^{M4(db,fo,fi)}$, with DO=DO(fi;fo;db)=max{do{fi;fo;db)};

to provide an index of documents in each file in each folder in each database as a concatenation of N=M1+M2+M3+M4 binary numbers; and to provide a partition of the database collection as a combination of L binary numbers (L≦N−1) and R=N−L binary numbers representing the M1 database indices, the M2 folder indices, the M3 file indices and the M4 document indices, where L is chosen from the group of integers consisting of M1, M1+M2 and M1+M2+M3.

8. The method of claim 7, further comprising constraining said binary number N to be at least one of N≦32, N≦48 and N≦64.

9. A method of partitioning a collection C of databases, where each database has a database index db, numbered db=1,..., DB, and contains at least one folder, each folder has a folder index fo(db), numbered fo(db)=1,..., FO(db), each folder contains at least one file, each file has a file index fi(fo,db), numbered fi(fo,db)=1..., FI(fo,db), each file contains at least one document, and each document has a document index do(fi,fo,db), numbered do(fi,fo,db)=1,..., DO(fi,fo,db), and each index being expressed as a sequence of one or more bits, the method comprising providing a computer that is programmed:

to receive positive and non-negative integers DB, ΔM1', FO, ΔM2', FI, ΔM3', DO and ΔM4', characterizing number of databases, number of folders in the databases, number of files in the folders, and number of documents in the files, respectively, in a collection of databases, where ΔM1'+ΔM2'+ΔM3'+ΔM4'≧1;

to determine a first exponent M1 satisfying $2^{M1-1} < DB \leq 2^{M1}$ and an augmented first exponent M1'=M1+ΔM1, where ΔM1 is a selected non-negative integer;

to determine a second exponent M2(db) satisfying $2^{M2(db)-1} < FO \leq 2^{M2(db)}$, with FO=FO(db)=max{fo(db)}, and an augmented second exponent M2'=M2+ΔM2, where ΔM2 is a selected non-negative integer;

to determine a third exponent M3(db;fo) satisfying $2^{M3(db,fo)-1} < FI \leq 2^{M3(db,fo)}$, with FI=FI(fo;db)=max{fi(fo;db)}, and an augmented third exponent M3'=M3+ΔM3, where ΔM3 is a selected non-negative integer;

to determine a fourth exponent M4(db;fo;fi) satisfying $2^{M4(db,fo,fi)-1} < DO \leq 2^{M4(db,fo,fi)}$, with DO=DO(fi;fo;db)=max{do{fi;fo;db)}, and an augmented fourth exponent M4'=M4+ΔM4, where ΔM4 is a selected non-negative integer, where ΔM1+ΔM2+ΔM3+ΔM4≧1;

to provide an index of documents in each file in each folder in each database as a concatenation of N=M1'+M2'+M3'+M4' binary numbers; and to provide a partition of the database collection as a combination of L binary numbers (L≦N−1) and R=N−L binary numbers representing the M1' database indices, the M2' folder indices, the M3' file indices, and the M4' document indices, where L is chosen from the group of integers consisting of M1', M1'+M2', and M1'+M2'+M3'.

10. The method of claim 9, further comprising constraining said binary number N to be at least one of N≦32, N≦48 and N≦64.

11. A method of partitioning a collection C of databases, where each database has a database index db, numbered db=1,..., DB, and contains at least one folder, each folder has a folder index fo(db), numbered fo=1,..., FO(db), each folder contains at least one file, each file has a file index fi(fo,db), numbered fi=1,..., FI(fo,db), each file contains at least one document, each document has a document index do(fi,fo,db), numbered do=1,..., DO(fi,fo,db), each document contains at least one of words, phrases, symbols, expressions and/or image components, each referred to collectively as "features," with each feature having a feature index fe, numbered fe=1,..., FE(fi,fo,db) and being expressed as a sequence of one or more bits, the method comprising providing a computer that is programmed:

to receive positive and non-negative integers DB, FO, FI, DO and FE, characterizing number of databases, number of folders in the databases, number of files in the folders, number of documents in the files, and number of features in the documents, respectively, in a collection of databases;

to determine a first exponent M1 satisfying $2^{M1-1} \leq DB < 2^{M1}$;

to determine a second exponent M2(db) satisfying $2^{M2(db)-1} \leq FO < 2^{M2(db)}$, with FO=FO(db)=max{fo(db)};

to determine a third exponent M3(db;fo) satisfying $2^{M3(db,fo)-1} \leq FI < 2^{M3(db,fo)}$, with FI=FI(fo;db)=max{fi(fo;db)};

to determine a fourth exponent M4(db;fo;fi) satisfying $2^{M4(db,fo,fi)-1} \leq DO < 2^{M4(db,fo,fi)}$, with DO=DO(fi;fo;db)=max{do{fi;fo;db)};

to determine a fifth exponent M5(db;fo;fi;do) satisfying $2^{M5(db,fi,do)-1} \leq FE < 2^{M5(db,fo,fi,do)}$, with FE=FE(do;fi;fo;db)=max{fe(do;fi;fo)};

to provide an index of features in each document in each file in each folder in each database as a concatenation of N=M1+M2+M3+M4+M5 binary numbers; and to provide a partition of the database collection as a combination of L binary numbers and R binary numbers, representing M1 database indices, M2 folder indices, M3 file indices and M4 document indices, plus S binary numbers representing the M5 feature indices, where (L,R) is an integer pair chosen from the integer pair group consisting of (M1,M2+M3+M4), (M1+M2,M3+M4) and (M1+M2+M3,M4).

12. The method of claim 11, further comprising constraining said binary number N to be at least one of N≦32, N≦48 and N≦64.

13. The method of claim 11, further comprising limiting said features in said document to words and phrases that are not an article, not a connective, not a possessive and not a preposition.

* * * * *